United States Patent Office 3,809,613
Patented May 7, 1974

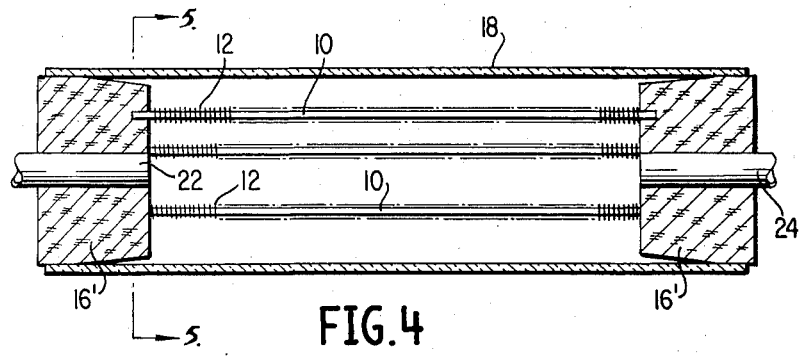
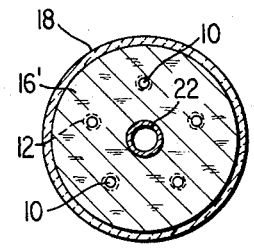
FIG.4　　　　　FIG.5
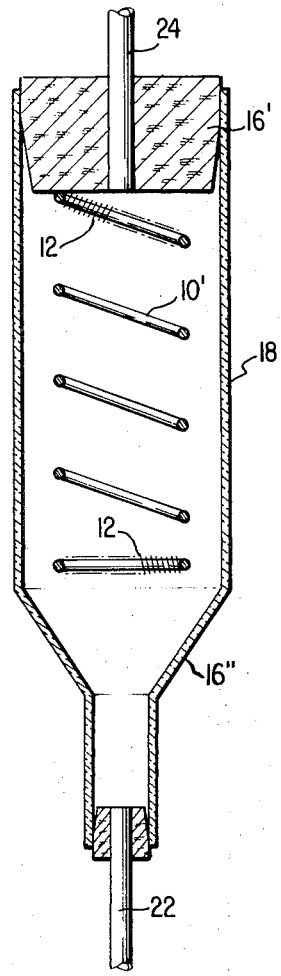
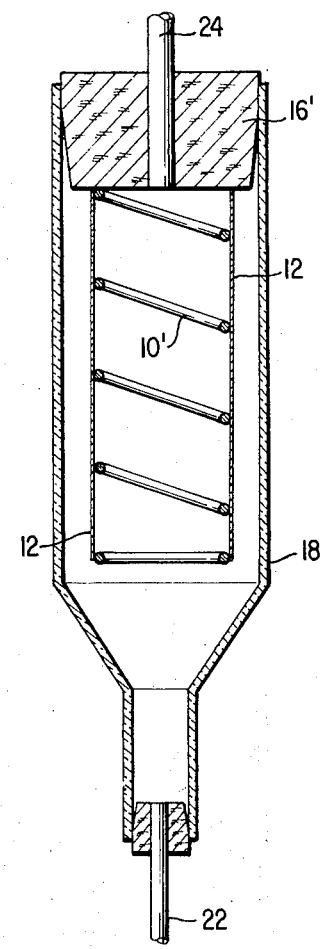
FIG.6　　　　　FIG.7

3,809,613
BIOCATALYTIC MODULE
Wolf R. Vieth, Belle Mead, Shaw S. Wang, North Brunswick, Seymour G. Gilbert, Piscataway, and Kalyanasundram Venkatasubramanian, New Brunswick, N.J., assignors to Research Corporation, New York, N.Y.
Filed May 28, 1971, Ser. No. 148,018
Int. Cl. C07g 7/02
U.S. Cl. 195—63    7 Claims

ABSTRACT OF THE DISCLOSURE

A biocatalytic module comprising an immobilized enzyme-membrane complex formed into a film having an elongate surface for enzyme-substrate contact; support means maintaining said elongate surface in a predetermined, substantially elongate form; spacing means substantially preventing different portions of said elongate surface from touching each other; and conduit means minimizing dispersion of a fluid substrate by substantially restricting the flow of the substrate to a direction parallel to the axis of the elongate surface. The biocatalytic modules are easily formed into insertable modules having high surface-to-volume ratios, and are useful for a wide variety of applications in enzymology.

BACKGROUND OF THE INVENTION

Field of the invention

This invention relates to biocatalytic modules. More particularly, this invention relates to such modules comprising an immobilized enzyme-membrane complex formed into a film having an elongate surface for enzyme-substrate contact, support means for maintaining the elongate surface in a predetermined, substantially elongate form, spacing means for preventing different portions of the elongate surface from touching each other, and conduit means for minimizing dispersion of a fluid substrate by substantially restricting the flow of said substrate to a direction parallel to the axis of the elongate surface.

Description of the prior art

Enzymes are protein catalysts which have been used for a wide variety of industrial and research applications, particularly in fermentation, pharmaceuticals, clinical testing, paper and textile processing, etc. They are highly specific in their activity and generally do not generate significant quantities of undesirable byproducts. Enzyme reactions are industrially advantageous since they do not require a large investment in heat transfer equipment and can be easily staged, thereby minimizing the problems associated with interstage product separations.

One problem which has long concerned those dealing with industrial applications of enzymes, however, is the difficulty in separating or recovering enzyme materials. In most commercial processes, the enzymatic reaction is effected by simply admixing the enzyme with the substrate, and thereafter inactivating and/or recovering the enzymes from the products or the unreacted substrate following the reaction. This procedure, however, has frequently resulted in damage to the product and inherent loss of large quantities of enzyme, since usually no enzyme is recovered or, if attempted, the yields are quite low.

To alleviate these problems, the art has developed various so-called "immobilized enzymes" in which the enzymes are immobilized or bound to inert or insoluble carriers. At the completion of the enzymatic reaction, these insoluble enzyme-containing materials can be separated from the unreacted substrate or product by techniques such as ultrafiltration or the like.

The selection of a suitable inert carrier, however, has been quite difficult, since the carrier must not only be inert to the enzyme, but it must not inhibit the catalytic activity of the enzyme, nor cause undesirable unspecific adsorption. Moreover, the carrier should present a minimum of steric hindrance toward the enzyme-substrate reaction. A wide variety of prior art carriers have been proposed, depending upon the particular type of enzyme used and the particular enzymatic reaction desired. For instance, among those prior art carriers disclosed in the literature are synthetic polymers such as polyamides and acrylic copolymers; cellulose derivatives; various clays; and ion-exchange resin, particularly DEAE-cellulose and DEAE-dextrans, as discussed in Suzuki et al., Agr. Biol. Chem., vol. 30, No. 8, pp. 807–812 (1966). Prior art methods of preparing immobilized enzymes have included direct covalent bonding, indirect bonding through an intermediate compound, cross-linking of the enzyme, or trapping the enzyme in polymer lattices.

One problem associated with many prior art immobilized enzymes is that they are generally packed into a chromatographic column or the like and reacted by passing a substrate solution therethrough. Packing requires time and effort, since the filled column must be washed initially to pack the immobilized enzyme granules, and washed again when a different enzyme or substrate is to be used. Flow rates are relatively slow and in general inversely related to the available surface area of the immobilized enzyme granules. Attempts to speed up flow rates by increasing the pressure differential between inlet and outlet ends of the packed column are often frustrated by a resultant tighter packing of the immobilized enzyme granules. Furthermore, radial and longitudinal dispersion of the substrate solution passing through the packed column results in a lower yield as compared to an equivalent contact time in a hypothetical "ideal reactor" operating without dispersion.

Copending patent application Ser. No. 135,753, filed on Apr. 20, 1971, describes immobilized enzymes prepared by complexing enzymes with a protein or polypeptide carrier, giving an insoluble complex which can be used, inter alia, in membrane form. The present invention deals with biocatalytic modules which may be prepared from these or any other immobilized enzymes capable of being formed into films or membranes.

A need exists, therefore, for an immobilized enzyme configuration which can be used as a structural part of a reaction system, so as to minimize or eliminate entirely separation problems. More specifically, a need exists for such a biocatalytic module which offers a large surface-to-volume ratio and minimizes dispersion of an enzymatic substrate so that enzymatic reactions can be efficiently conducted by passing the substrate through the biocatalytic module.

SUMMARY OF THE INVENTION

Accordingly, one object of this invention is to provide an immobilized enzyme in a modular form.

Another object of this invention is to provide an immobilized enzyme module offering a large surface-to-volume ratio.

A further object of this invention is to provide immobilized enzyme modules which minimize the radical and longitudinal dispersion of the substrate flowing therethrough.

An additional object of this invention is to provide immobilized enzymes in a modular form which may be readily varied in size.

A more particular object of this invention is to provide readily replaceable immobilized enzyme cartridges.

Briefly, these and other objects are attained in one aspect of the present invention which provides a biocatalytic module comprising an immobilized enzyme-membrane complex formed into a film having an elongate surface for enzyme-substrate contact; support means maintaining the elongate surface in a predetermined, substantially elongate form; spacing means substantially preventing different portions of the elongate surface from touching each other; and conduit means minimizing dispersion of a fluid substrate by substantially restricting the flow of the substrate to a direction parallel to the axis of the elongate surface. The modules may be provided with a filter and protective casing to provide an insertable module.

BRIEF DESCRIPTION OF THE DRAWINGS

These and other objects, features, and advantages of the present invention will become more fully apparent to those skilled in the art by reference to the following description and examples of exemplary preferred embodiments of the invention together with the annexed drawings, wherein like reference numerals designate like or corresponding parts throughout the several figures, and in which:

FIG. 4 is a schematic view, partially in cross-section, of a biocatalytic module formed from a plurality of rods individually layered with an immobilized enzyme-membrane complex;

FIG. 5 is a cross-sectional view taken through line 5–5' of FIG. 4;

FIG. 6 is a schematic view, partially in cross-section, of a biocatalytic module formed from a helical support layered with an immobilized enzyme-membrane complex;

FIG. 7 is a similar view of a module having a tubular immobilized enzyme-membrane complex fitted over a helical support.

DESCRIPTION OF THE PREFERRED EMBODIMENTS

Figure 1:
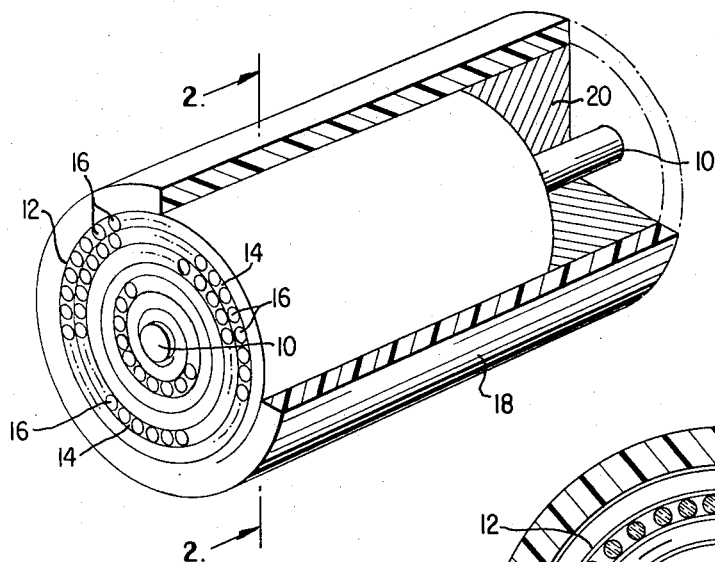
FIG. 1 is a perspective view, partially in cross-section, of one preferred embodiment of the invention.
Figure 2:
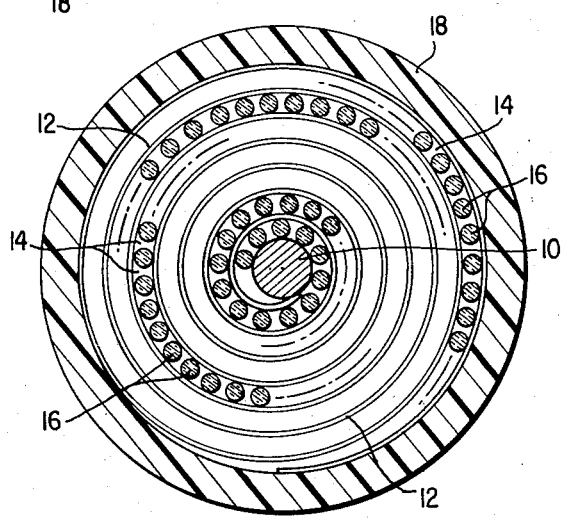
FIG. 2 is a partial cross-section view taken along line 2—2 of FIG. 1.

While as previously indicated, any immobilized enzyme capable of existing in or on a membrane, film, or sheet may be used to form modules of the present invention, the description below will be given in terms of using complexes of collagen with various enzymes, as described and claimed in the aforementioned copending application, since they are simple to prepare and handle. In general, immobilized enzymes capable of existing in or on a membrane, film, or sheet include a wide variety of enzymes complexed with proteins, polypeptides, synthetic polymers and other. Non-limiting examples of suitable protein materials include collagen, zein, casein, ovalbumin, wheat gluten, fibrinogen, myosin, mucoprotein, and the like. Non-limiting examples of synthetic polypeptides include polyglutamate, polyaspartate, polyphenylalanine, polytyrosine, and copolymers of leucine with p-amino phenylalanine. Non-limiting examples of suitable synthetic polymers include copolymers of methacrylic acid and methacrylic acid-3-fluoro-4,6-dinitroanilide; copolymers of ethylene and maleic anhydride; styrene polymers containing nitrofluorobenzene sulfonyl groups; carboxymethyl cellulose; DEAE-cellulose; other carboxylic resins; polyamides; polyaminostyrenes; etc.

Such films or membranes may contain one or more enzymes (e.g., a combination of amylases). Different modules containing different, individual enzymes or different combinations of enzymes can be staged in series or in parallel arrangement to suit each individual process. In the case of non-diffusible primary substrates, the modules of immobilized enzymes can be used in conjunction with a digestion tank where free enzymes, microencapsulated enzymes, or other catalysts are used for primary substrate degradation. An ultra-filtration process can be used to recover and recycle the enzymatic catalysts used in the digestion tank. Furthermore, suitable enzyme-membrane complexes themselves can also be used as the ultrafiltration membranes of choice to catalytically facilitate the desired membrane transport processes. The overall reaction-separation system may employ a batch operation, a semi-batch operation, a continuous operation, or any combination of these contact modes.

Likewise, while numerous other methods are suitable for preparing biocatalytic modules comprising an immobilized enzyme-membrane complex formed into configurations which minimize dispersion of a fluid substrate by substantially restricting the flow of the substrate to a direction parallel to the axis of elongate enzyme-membrane complex surfaces, the description below will be given in terms of forming such modules from an axial support spirally wound with an immobilized enzyme-membrane complex with overlapping spiral layers formed into a plurality of substantially parallel capillaric components by spacer members oriented substantially parallel to the axial support and separating the overlapping spiral layers.

Also described are biocatalytic modules prepared from rods or wires, in either bundle or spiral form, which support narrow strips of an immobilized enzyme-membrane complex, and biocatalytic modules prepared using a tube of immobilized enzyme-membrane complex joined with resin from a flat sheet, and then stretched over a spiral of wire or other suitable radial support. While other methods of construction may also be used to form a plurality of substantially parallel capillaric components, the techniques described below present particularly easy methods by which the biocatalytic modules of the present invention may be prepared and easily handled.

Illustrative other methods of construction include forming one or more capillaric concentric layers of immobilized enzyme-membrane complex; forming or coating a plurality of capillary or microcapillary tubes on one or both sides with an immobilized enzyme-membrane complex and forming a bundle therefrom; forming or coating honeycomb structures with immobilized enzyme-membrane complexes, etc.

Briefly, preferred enzyme-collagen complexes which may be used in the present invention are prepared by swelling a collagen membrane, washing it, and contacting it with an aqueous solution of enzyme thereto for a period of time sufficient to form complexes between the enzyme and the collagen carrier. The membrane may then be poured into sheets, such as by layering over a suitable supporting base, for example cellulose acetate. Such materials may be dried and stored for long periods of time prior to use. Such films are ideally suited to spiral winding in order to form one embodiment of the modules of the present invention.

Suitable methods for forming a collagen membrane include first treating the collagen source with a proteolytic enzyme solution to dissolve the elastin which encircles and binds the collagen fibers. The collagen source is then washed with water, and the soluble proteins and lipids removed by treatment with a dilute aqueous solution of a chelating agent, such as EDTA. The fibers are then swollen in a suitable acid or base so as to form a collagen fiber dispersion, such as described in U.S. 2,920,000, which can then be formed into a suitable membrane by any convenient technique such as by extruding, casting or electrodeposition methods described in British Pat. No. 1,153,551.

While the thickness of the film used to form the modules of the present invention is not critical except within broad limits, it will be realized that enzymatic activity may be concentrated at the surface thereof. Accordingly, the minimum thickness will be determined by the required mechanical strength and lack of pinholes or other structural defects, depending upon the particular film and/or substrate utilized. The maximum thickness will generally be determined by economic considerations. Films which are over 0.1 mm. thick further tend to result in a lower surface-to-volume ratio, resulting in a loss of efficiency. The collagen membranes useful in the present invention generally have a dry thickness of from 0.005 mm. to 0.1 mm., preferably from 0.01 mm. to 0.05 mm.

Following the swelling treatment, the swollen collagen membrane is washed thoroughly with water and/or a buffering compound in order to bring the pH level of the membrane within the acceptable range for the particular enzyme being complexed. The swollen, washed membrane is then soaked in an aqueous enzyme solution to allow the enzyme to diffuse into the membrane, usually overnight under refrigeration. The enzyme-collagen complex may be dried, either before or after layering on a supporting substrate such as cellulose acetate film, and may then be stored under refrigeration for a long period of time. It will be appreciated that a large number of enzymes may be complexed by this and other methods to yield immobilized enzyme-membrane complexes which may be used in accordance with the present invention. Suitable enzymes include amylase, lysozyme, invertase, urease, cellulases, catecholmethyltransferase, sucrose 6-glucosyl-transferase, amylopectin-1,6-glucosidase, oligo-1,6-glucosidase, polygalacturonase, carboxyl esterase, aryl esterase, lipase, pectin esterase, glucoamylase, $\alpha$-glucosidase, $\beta$-glucosidase, $\beta$-galactosidase, glucose oxidase, galactose oxidase, catechol oxidase, catalase, peroxidase, lipoxidase, glucose isomerase, pentosanases, cellobiase, xylose isomerase, sulphite oxidase, ethanolamine oxidase, penicillinase, carbonic anhydrase, gluconolactonase, 3-keto steroid $\Delta'$-dehydrogenase, 11$\beta$-hydroxylase, and amino acid acylases. Especially suitable, however, are lysozyme, invertase, urease, cellulase, and amylases. Compatible combinations of enzymes, and multienzyme systems can also be complexed with the collagen in this manner. For example, it is desirable to complex alpha-amylase with other types of enzymes, since alpha-amylase is capable of randomly cleaving a starch molecule so as to present reactive sites for other more specific enzymes. Other combinations will be apparent to those skilled in the art.

Once the desired immobilized enzyme-membrane complex has been prepared, the biocatalytic modules of the present invention are prepared by forming the complex into a plurality of substantially parallel capillaric components, or by forming the complex into a strip-wrapped rod/wire bundle, or a strip-wrapped spring, or a tubular reactor. In the spiral and tubular reactors, a unique feature is that the flow of substrate occurs both over and through the membrane.

While intact sheets of the membrane complex are used in tubular and capillaric coil reactors, such sheets are cut into thin strips and wound around metallic rods/wires to form the strip-wrapped rod/wire bundles and the strip-wrapped spring reactor. Higher surface-to-volume ratios are obtained in this way while retaining good mechanical support and contact efficiency. By suitable reduction of the strip dimension, e.g., to small fiber dimensions, it is possible to obtain surface-to-volume ratios of as high as 30,000. Of course, such fibers might be either solid or hollow.

A preferred configuration which is easy to prepare and handle is one which is formed from an axial support spirally wound with an immobilized enzyme-membrane complex, with the overlapping spiral layers formed into a plurality of substantially parallel capillaric components by spacer members oriented substantially parallel to the axial rod used to separate overlapping spiral layers.

Referring now to the drawings, FIG. 1 is a perspective view, partially in cross-section, of one preferred embodiment of the invention described more particularly below. An axial rod 10 functions as a central supporting member, which is spirally wound with a membranous immobilized enzyme 12. The overlapping spiral layers are formed into a plurality of parallel capillaric components 14 by spacer rods 16 oriented substantially parallel to the axial rod 10, and separating the overlapping spiral layers. If desired, the entire module may be provided with an inert protective casing 18 and a filter 20, in a configuration such as shown in FIG. 1 to provide an insertable module. Membranous layers 12 may be an immobilized enzyme-membrane complex alone, or such a complex layered on one or both sides of a supporting carrier (not shown).

The axial support and spacer members may be of any material which is inert with respect to the reaction conditions to be encountered and the enzyme-membrane complex being used. When using glass, some loss of activity may be experienced due to dissolution of the glass. Also, since some glass is attacked by alkali, other material may be preferred when the enzyme to be used has an optimum pH on the alkaline side.

The axial support can either be rod-shaped glass, plastic, ceramic, and the like, or a thin sheet or membrane of spongy material such as a polyurethane or other plastic foam. In the case of a rod-shaped support, it may be solid or hollow, and preferably will have an O.D. of from 2 mm. to 7 mm. for a module with an overall volume of $\pi(3.13)^2 \times 7.5$ cm.$^3$. Use of larger diameter supports is acceptable, but decreases the surface:volume ratio of the module. Axial supports smaller than indicated are likewise acceptable, but are somewhat more difficult to mount properly.

One end of the immobilized enzyme-membrane complex is affixed to the axial support by any suitable means to facilitate spiral winding. A plurality of spacer members are then affixed to the membrane complex, facilitated by the fact that the film sticks to the glass rods when the rod is wetted wtih water. Suitable distances between rods vary as the winding procedure progresses. Preferably, the spacers will be located at intervals small enough to prevent the membrane from coming into contact with overlapping and underlapping layers when wound, and at intervals large enough to maximize the surface-to-volume ratio of the module. The spacer members may be of any desired cross-sectional configuration, although circular or elliptical cross-sectional configurations are preferred. In use, the spirally wound module may shrink over a period of time. One feature of this invention is that additional immobilized enzyme-membrane complex material may be added to restore the original volume of the module merely by wrapping additional complex around the spirally wound module. Preferably, the entire module will be encased in a hollow, inert protective casing, and, if desired, a coarse filter element may be inserted into one end thereof to filter substrate solution at the inlet end of the module.

Another preferred configuration which is easy to prepare and handle is one which is formed from a bundle of straight rods wrapped with thin strips of immobolized enzyme-membrane complex as shown in FIGS. 4 and 5. The straight rods used may be any suitable material such as glass, plastic, ceramic, wire, or the like. The length-to-diameter ratio of the rods may vary depending upon the material used. Preferably, this ratio will be small enough to give the material enough strength to prevent or resist deformation, and large enough to maximize the surface-to-volume ratio of the reactor. The rods are then wrapped roundabout with thin strips of enzyme-membrane complex. The suitable width of the enzyme-membrane complex depends on the diameter of the rod used. For example, a width of 2.5 mm. of 1 mil thick membrane complex is suitable for a rod with a diameter of from 1 mm. to 3 mm. Preferably, the rods are then held in parallel position by capping with disk-shaped headers with suitably drilled holes or in the holes of screen type headers similarly placed. Preferably, the entire module will be encased in a hollow biochemically inert protective casing.

Referring to FIGS. 4 and 5, a biocatalytic module is shown formed from a plurality of support means 10 for maintaining the elongate surface of the immobilized enzyme-membrane complex 12 in a predetermined, substantially elongate form. Each of the rods shown is individually layered with an immobilized enzyme-membrane complex 12 formed into a film having an elongate surface for enzyme-substrate contact. Spacing means 16', illustrated as disk-shaped header caps with suitably spaced holes for receiving the ends of the wound support rods 10, serve to prevent different portions of the elongate contact surface of the immobilized enzyme-membrane complex 12 from touching each other. A biochemically inert, tubular protective casing 18 cylindrically surrounds the parallel support rods 10, thereby minimizing dispersion of the fluid substrate by substantially restricting its flow to a direction parallel to the axis of the elongate substrate contact surface of immobilized enzyme-membrane complexes 12. To facilitate use as an insertable module, the biocatalytic module of this example is provided with a substrate inlet 22 and a substrate outlet 24, such as the hollow glass tubing shown.

If the preferred supporting materials used in making the membrane strip wrapped rod bundle are easily molded into a spring form it is also preferable to use this form, as shown in FIG. 6. In this embodiment, the immobilized enzyme-membrane complex 12 is formed into a film having an enlongate surface for enzyme-substrate contact by wrapping it around a spring-shaped support means 10', which maintains the elongate surface in a substantially elongate, helical form. Support means 10' may also function for preventing different portions of the elongate surface from touching each other, or spacing means 16' may be additionally provided (such as in the case of a highly flexible support means) to prevent different portions of the elongate contact surface from touching each other, As shown in FIG. 6, spacing means 16 may merely be an insertable cork, or, as shown at 16" a tapered neck in protective casing 18. A number of membrane strip-wrapped springs can be nested either axially or concentrically in an inert casing to form a compact biocatalytic cartridge.

Still another preferred configuration is the tubular reactor shown in FIG. 7 which uses a tube of immobilized enzyme-membrane complex 12 joined from a flat sheet which is then stretched over a spiral tube support means 10', such as a spiral of wire, plastic or the like. A unique feature of the tubular reactor is that the flow of substrate occurs both over and through the tubular membrane. The smaller the diameter of the tube, the larger will be the surface-to-volume ratio. A number of such tubular reactors may be nested in parallel with a suitable mechanically supportive spacer, such as by wrapping them layerwise with a plastic sponge sheet, then inserting this cartridge into an inert casing to form a compact biocatalytic module. In this case, the roles of the membrane and spacer are simply reversed in comparison with the capillaric coil module of FIG. 1. The construction of the module shown in FIG. 7 is similar to that shown in FIG. 6 and, indeed, may be combined with the construction features shown in FIGS. 5 and 6.

One advantage offered by the biocatalytic modules of this invention is that large, molecules, such as antibodies and other proteins, and particulate materials, such as cell suspensions, can readily penetrate the modules, being exposed to the action of the enzyme thereon. This is in marked contrast to prior art methods, particularly where the use of ion-exchange materials and molecular sieves results in entrapment or filtration of materials which are present in the substrate solution to be treated. The biocatalytic modules of the present invention do not possess such drawbacks.

Having now generally described the invention, a further understanding may be obtained by reference to the following illustrative examples which are included herein for the purposes of illustration, and are not intended to be limiting unless so specified.

EXAMPLE 1

6 cc. of a 1 mil thick invertase-collagen complex layered on 1 mil thick cellulose acetate and having overall dimensions of 5.5 cm. x 235 cm. was used as membranous enzyme 12 to construct the cartridge shown in FIG. 1. As the central axially oriented rod 10, a Teflon rod 5.5 cm. long and 6 mm. in outside daimeter was used. Type 180 glass tubing, 5.5 cm. long and having an outside diameter of 3 mm., was sealed at both ends and used as spacers 16 in constructing the cartridge.

The invertase-collagen membrane complex 12 is coiled upon the spacers 16, and sticks to the glass rods when wet with water. The spacers are located at intervals small enough to prevent the membrane from coming into contact with overlapping and underlapping layers, and at intervals large enough to maximize the surface-to-volume ratio so as to form a plurality of capillaric components 14 which present a large surface area for the substrate solution. In the particular example using a film having a thickness of 1 mil and glass tubes having an outer diameter of 3 mm., such a spacing is approximately from 6.0 mm. to 13.0 mm. for a module with a diameter of 6.25 cm. After coiling the invertase-collagen membrane complex upon the spacers as indicated above, the cartridge is then fitted into a tube 18 of any suitable material, such as plastic, to form a flow-through reactor configuration as indicated in FIG. 1. A coarse filter 20 may be affixed to the inlet end when required by the nature of the feed solution.

A series of sucrose hydrolysis experiments was performed in order to test the biocatalytic cartridge. It was found that after 10 individual experiments were made, the module shrunk slightly, and it was necessary to add 2 cc. of a 1 mil thick cellulose acetate film to enlarge the shrunken module and restore its snug fit in the housing. One advantage of the module of this invention is that its size may be varied in this manner.

Figure 3:
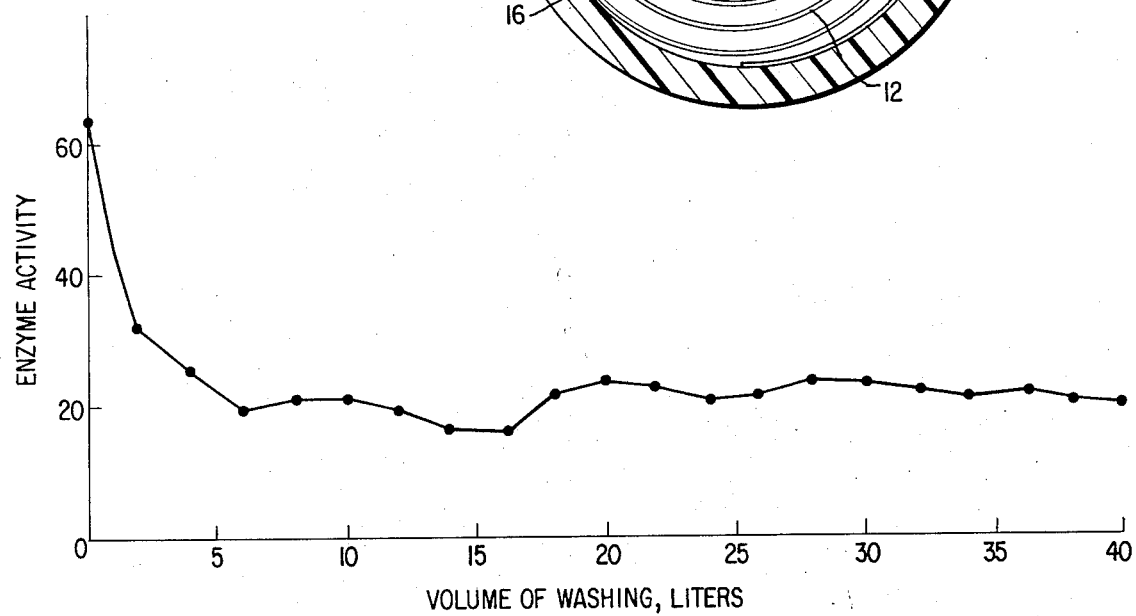
FIG. 3 is a graph of enzyme activity plotted as a function of the volume of washings of the module shown in FIGS. 1 and 2.

In testing enzyme activity, 400 cc. of a 6% sucrose solution was used as the substrate. The module was connected to a substrate reservoir, and a polarimeter loop was used to assay enzymatic activity. The flow rate of the substrate solution through the cartridge was 300 ml. per minute and the substrate was recycled. The overall reaction time for each experiment was 30 minutes at room temperature. Before reusing the reactor for another experiment, it was washed by 2 liters of distilled water. A series of experiments was carried out over a total time span of seventy days, and the module reactor was stored at 2° C. while not being used. FIG. 3 shows a plot of reaction rates as percentage conversion of sucrose against the liters of washings inbetween experiments, and indicates that the module shows a stable retention of approximately one-third of its original enzymatic activity, which remains constant even after 20 liters of washing. The module was still comparatively active 8 months after these series of experiments was begun, indicating good stability and the possibilities of long-term use of such a module.

EXAMPLE 2

A membrane strip-wrapped rod bundle module as shown in FIG. 4 was prepared. A lysozyme-collagen complex 15 cm. x 10 cm. and 1 mil thick was slit into thin strips of about 0.25 cm. width. These strips were wound around a metallic rod 0.16 cm. diameter and 13 cm. long. Five such rods were then fitted into a glass tube 1.7 cm. diameter and 14 cm. long. The rods were held in position by placing them in suitably drilled holes in the corks fitted at the ends of the glass tube. The rods were placed at equal radial distance. The clearance between the glass tube and the periphery of the circle formed by the rods was 0.5 cm. One-tenth cc. of the lysozyme-collagen complex was used. Experiments were conducted to test the performance of the module, using a 300 mg./l. suspension of *Micrococcus lysodeikticus* in a phosphate buffer of pH 7.0, as the substrate. The lysing reaction as indicated by decrease in turbidity was followed spectrophotometrically. Percentage cells lysed in 30 minutes was then calculated and found to be 83±10% (average of two successive experiments).

EXAMPLE 3

A membrane strip-wrapped spring reactor module was made (FIG. 6). Lysozyme-collagen complex, 0.4 cc., 1 mil thick, was slit into thin strips of 0.25 cm. width, and was used to construct this module. A metallic coil of diameter 1.6 cm. and length 18 cm., made from metallic wire of 0.16 cm. diameter, was wrapped with these strips and was then fitted into a glass tube 3 cm. diameter and 28 cm. long. The clearance between the glass tube and the coil was 0.7 cm. The module was then used to lyse *Micrococcus lysodeikticus*, and the catalytic activity was found to be 78% cells lysed in 30 minutes.

EXAMPLE 4

A tubular reactor (FIG. 7) was made by joining the sides of an 18 cm. x 10 cm., 1 mil thick lysozyme-collagen complex with Resyn 30–9057 (National Starch and Chemical Corp.). A helical coil of 1.6 cm. diameter and 18 cm. long, made from 0.16 cm. diameter metallic wire was used as support, over which the lysozyme-collagen complex was fitted. The tube thus formed was fitted into an outer glass tube of 3 cm. diameter, and 28 cm. long, with a clearance of 0.7 cm. The module was used to lyse *Mycrococcus lysodeikticus*, and the catalytic activity was found to be 77±6% (average of two successive experiments).

The biocatalytic modules of the present invention may be subjected to pressures in a preferred range of 5 to 200 p.s.i.g., thereby facilitating rapid flow rates of substrate therethrough. Unlike conventional column chromatography-type carriers of the prior art, there is little or no back mixing or dispersion in the module. Furthermore, the insertable cartridge of the biocatalytic modules of the present invention offer significant advantages in replacing immobilized enzymes, as compared to the tedious packing and unpacking of a chromatographic column. Additionally, the surface-to-volume ratios of the biocatalytic modules of this invention are comparable or better than those attainable with packed columns. For example, a typical capillaric coil module such as that described in Example 1, has a surface-to-volume ratio of 500 cm.$^{-1}$; the strip-wrapped rod bundle spring has a ratio of 1,000 cm.$^{-1}$. In a granular column, this figure is limited by plugging of the column if fine particles are used. However, no such disadvantage is inherent in the modules of the present invention.

It will be appreciated that while the foregoing disclosure relates to only preferred embodiments of the invention for preparing biocatalytic modules from membranous immobilized enzymes formed into configurations which minimize the dispersion of a fluid substrate by substantially restricting the substrate flow to a direction parallel to the axis of elongate immobilized enzyme-membrane complex surfaces, it is capable of numerous modifications or alterations which may be made by those skilled in the art without departing from the spirit and scope of the invention as set forth in the appended claims.

What is claimed as new and desired to be secured by Letters Patent of the United States is:

1. A biocatalytic module comprising:
   (a) an immobilized enzyme-membrane complex formed into a film having an elongate surface for enzyme-substrate contact, said membrane complex consisting essentially of an enzyme complexed directly to a protein or polypeptide of a protein or polypeptide membrane, said protein being selected from the group consisting of collagen, zein, casein, ovalbumin, wheat gluten, fibrinogen, myosin, and mucoprotein, and said polypeptide being selected from the group consisting of polyglutamate, polyaspartate, polyphenylalanine, polytyrosine, and copolymer of leucine and p-amino phenylanaline whereby complexing occurs by contacting said enzyme to said protein or polypeptide to form complexing groups selected from the group consisting of multiple hydrogen bonds, salt linkages and Van der Waals interactions, and whereby said membrane retains sufficient enzyme activity to effect an enzymatically catalyzed reaction when an enzymatically treatable substrate is contacted therewith; wherein said immobilized enzyme-membrane complex is spirally wound around an axial support so as to form capillaric components which are formed by spacer members oriented substantially parallel to said axial support separating adjacent overlapping spiral layers of said immobilized enzyme-membrane complex:
   (b) conduit means minimizing dispersion of a fluid substrate by substantially restricting the flow of said substrate to a direction parallel to the axis of said elongate surface.

2. The biocatalytic module of claim 1, further comprising a longitudinally extending, biochemically inert protective casing surrounding said biocatalytic module, said protective casing having a fluid inlet and a fluid outlet.

3. The biocatalytic module of claim 2, wherein said protective casing is further characterized by having a fluid inlet and a fluid outlet at opposite ends thereof.

4. The biocatalytic module of claim 3, further comprising a filter element enclosed by said protective casing at the fluid inlet end thereof.

5. The biocatalytic module of claim 1, wherein said immobilized enzyme is an oxidoreductase, transferase, hydrolase, isomerase, or compatible mixture thereof.

6. The biocatalytic module of claim 1, wherein said immobilized enzyme is lysozyme, urease, amylase, invertase, cellulase, glucose isomerase, or compatible mixture thereof.

7. The biocatalytic module of claim 1, wherein said protein is collagen or zein.

References Cited

UNITED STATES PATENTS

| | | | |
|---|---|---|---|
| 3,574,062 | 4/1971 | Sato | 195—63 |
| 3,228,876 | 1/1966 | Mahon | 210—22 |
| 3,243,356 | 3/1966 | Kirimura et al. | 195—68 X |
| 3,242,055 | 3/1966 | Lucia | 195—116 X |
| 3,705,084 | 12/1972 | Reynolds | 195—63 |

FOREIGN PATENTS

| | | | |
|---|---|---|---|
| 953,414 | 3/1964 | Great Britain | 195—116 |

OTHER REFERENCES

Michaels, A. S.: New Separation Technique for the CPI, Chemical Engineering Progress, vol. 64, No. 12 1968 (pp. 31–43).

Lilly, et al.: The Operation of Biochemical Reactors Using Fixed Enzymes, Biochem. J., vol. 107, March 1968 (p. 58).

Goldman et al.: Papain Membrane on a Collodion Matrix, Science, vol. 150, 1965 (pp. 758–760).

Silman et al.: Some Water-Insoluble Papain Derivatives, Biopolymers, vol. 4, 1966 (pp. 441–448).

DAVID M. NAFF, Primary Examiner

U.S. Cl. X.R.

195—68, Dig. .11, 116, 139